(12) United States Patent
Arauz-Rosado

(10) Patent No.: US 8,483,094 B2
(45) Date of Patent: Jul. 9, 2013

(54) IMS-BASED DISCOVERY AND CONTROL OF REMOTE DEVICES

(75) Inventor: Jesus-Javier Arauz-Rosado, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 229 days.

(21) Appl. No.: 12/809,295

(22) PCT Filed: Oct. 29, 2008

(86) PCT No.: PCT/EP2008/064691
§ 371 (c)(1),
(2), (4) Date: Dec. 22, 2010

(87) PCT Pub. No.: WO2009/080398
PCT Pub. Date: Jul. 2, 2009

(65) Prior Publication Data
US 2011/0110271 A1    May 12, 2011

Related U.S. Application Data

(60) Provisional application No. 61/015,298, filed on Dec. 20, 2007.

(51) Int. Cl.
*H04L 12/28* (2006.01)
(52) U.S. Cl.
USPC ............................ 370/255; 370/332; 370/352
(58) Field of Classification Search
None
See application file for complete search history.

(56) References Cited

U.S. PATENT DOCUMENTS

| 7,899,964 B2* | 3/2011 | Song et al. ............... 710/104 |
| 2006/0133392 A1 | 6/2006 | Ajitomi et al. |
| 2007/0143489 A1 | 6/2007 | Pantalone |
| 2009/0092101 A1* | 4/2009 | Busch et al. ............... 370/332 |
| 2010/0232422 A1* | 9/2010 | Blanco et al. ............... 370/352 |
| 2010/0281251 A1* | 11/2010 | Arauz Rosado ........... 713/152 |
| 2011/0110271 A1* | 5/2011 | Arauz-Rosado ........... 370/255 |
| 2011/0310884 A1* | 12/2011 | Arauz-Rosado ........... 370/352 |

OTHER PUBLICATIONS

International Search Report for PCT/EP2008/064691, mailed Apr. 15, 2009.
International Preliminary Report on Patentability for PCT/EP2008/064691, presented in the PCT Application on Oct. 20, 2009, with 7 Amended Sheets.

* cited by examiner

*Primary Examiner* — Robert Wilson
(74) *Attorney, Agent, or Firm* — Nixon & Vanderhye, P.C.

(57) ABSTRACT

The present invention faces the issues of remotely controlling multiple LAN-attachable devices (1a-1m) and provides for means and method of controlling the LAN-attachable devices from a CP-terminal (2) through an IMS network (51, 52). Basically, the invention provides for the allocation of unique identifiers to each LAN-attachable device (S-020), the exposure of these identifiers in an appropriate entity under control of a SIP network operator (S-045), fetching these identifiers from the CP-terminal (S050), the submission of control commands from the CP-terminal though the IMS network towards a Remote Gateway (S-055), where the LAN-attachable devices are accessible through a home LAN network, and the submission of corresponding control command from the Remote Gateway towards the LAN-attachable devices (S-060).

20 Claims, 5 Drawing Sheets

FIG.-1-

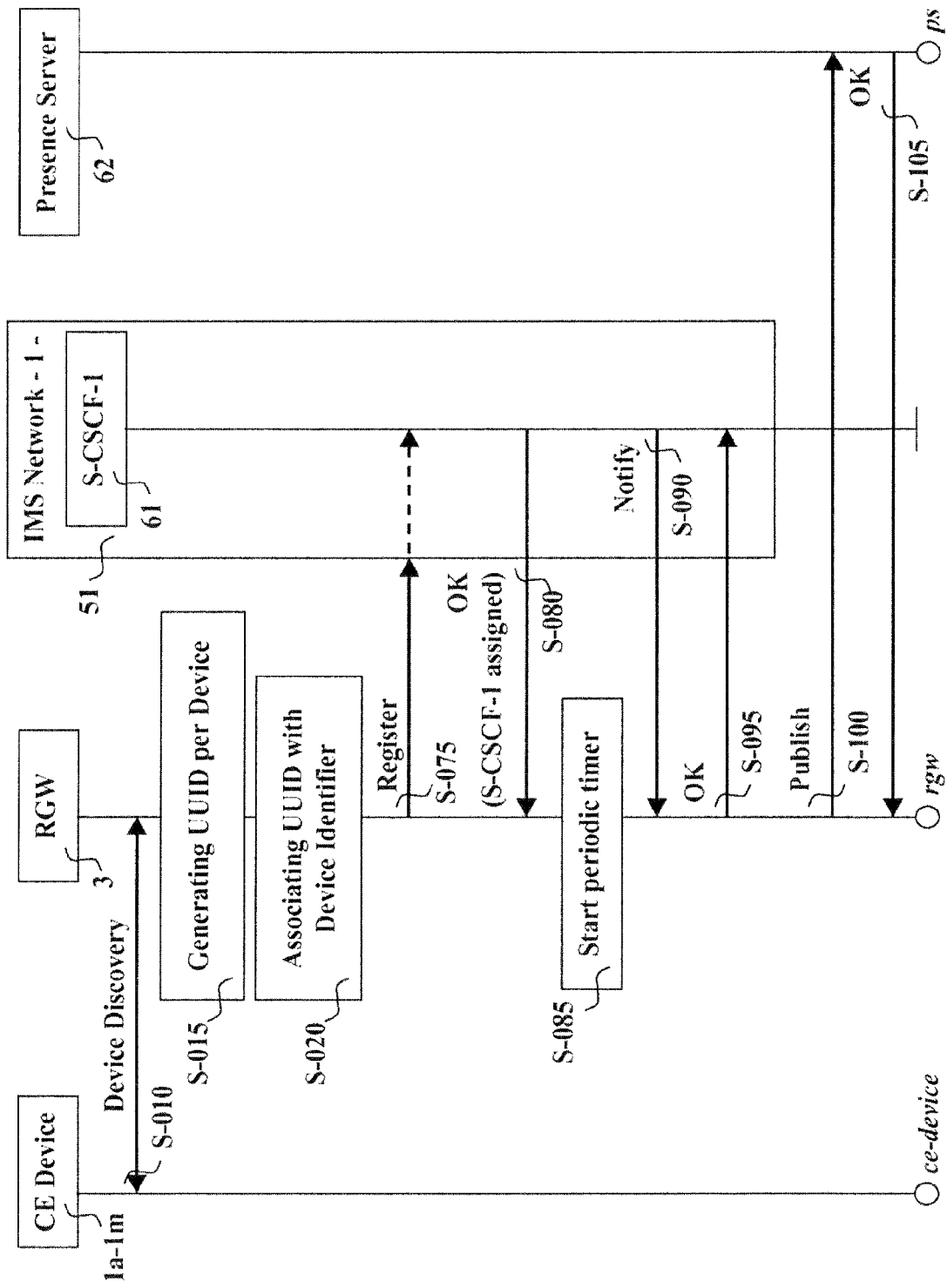
FIG.-3A-

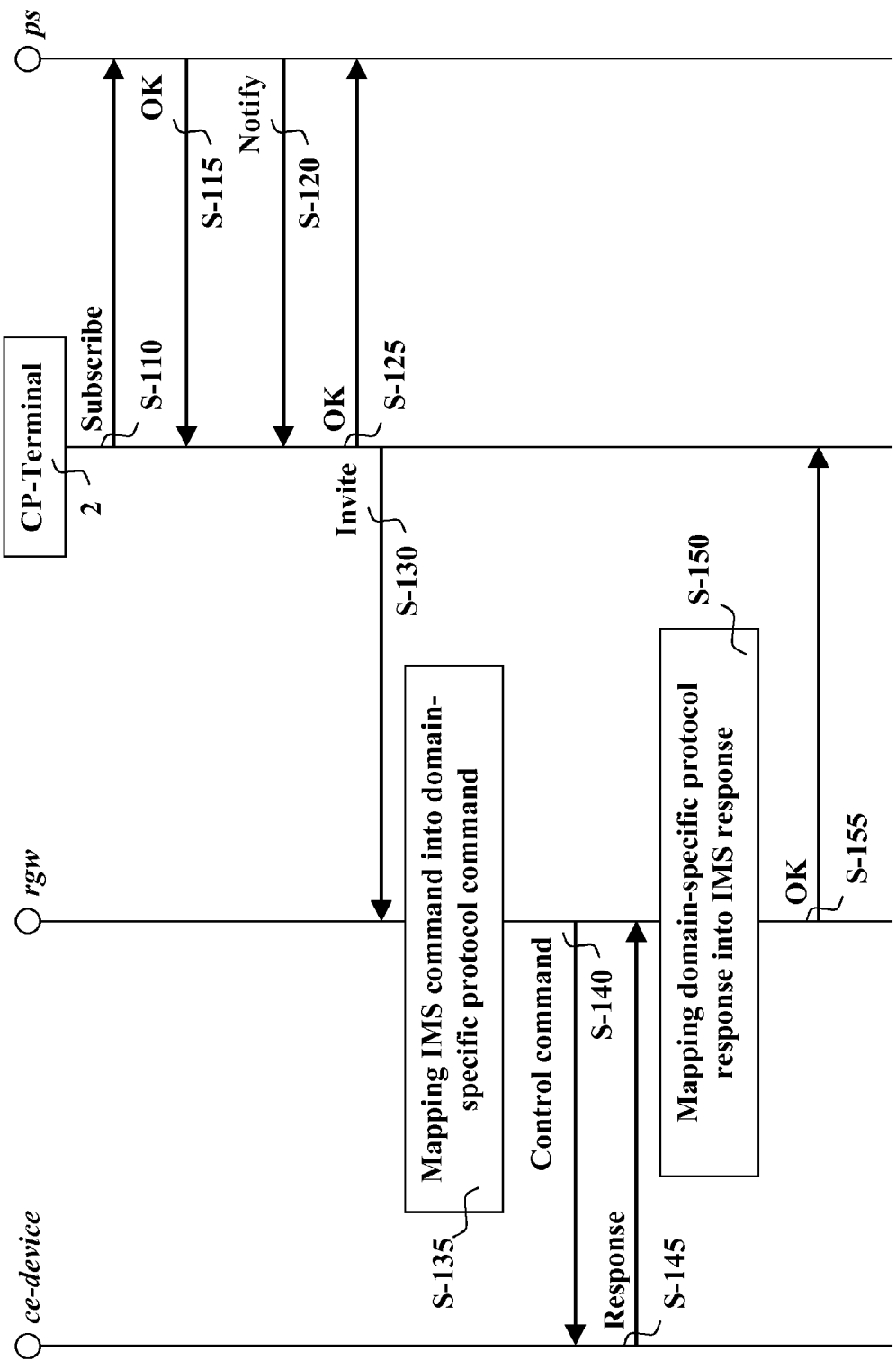
FIG.-3B-

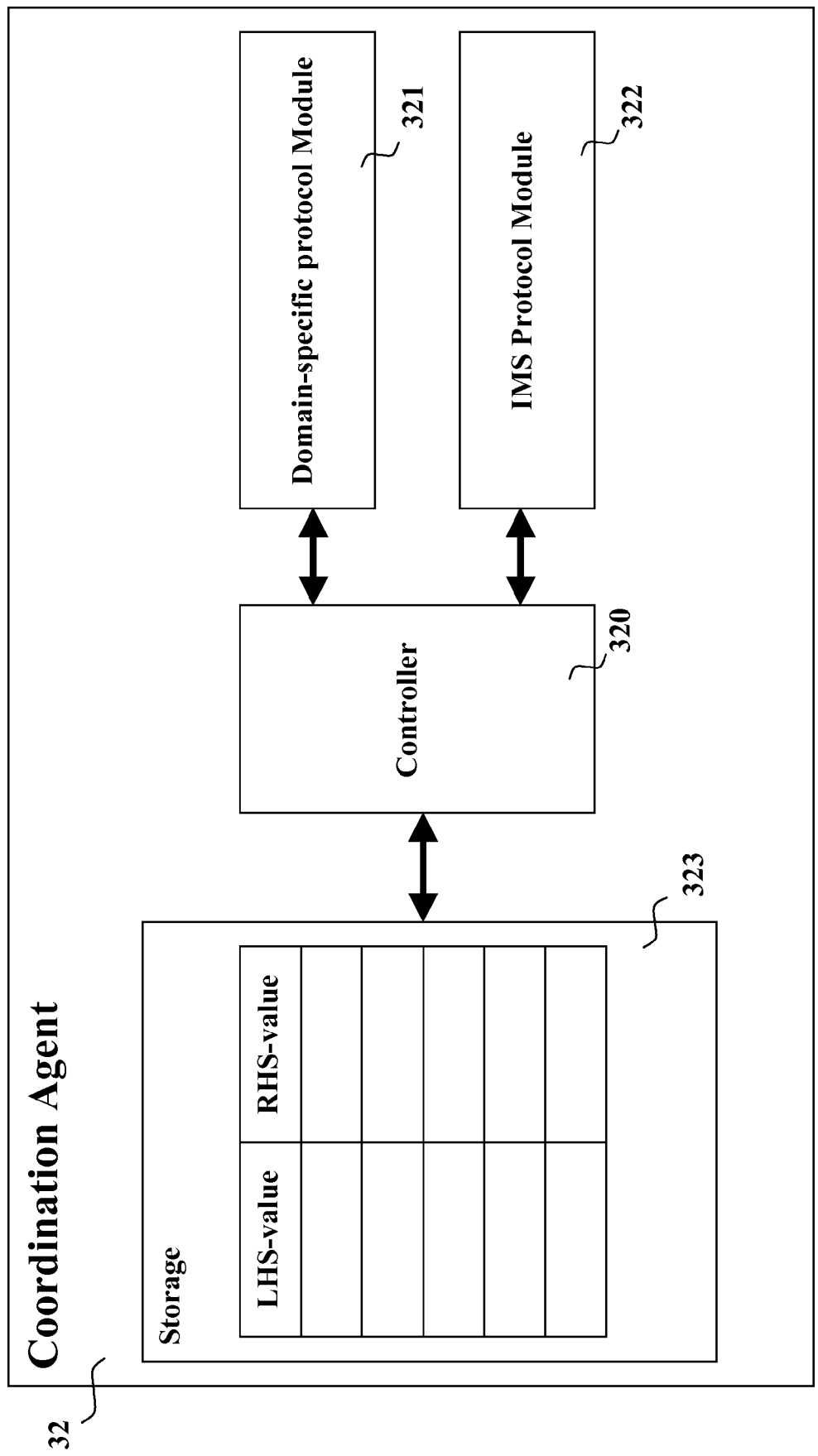
FIG.-4-

IMS-BASED DISCOVERY AND CONTROL OF REMOTE DEVICES

This application is the U.S. national phase of International Application No. PCT/EP2008/064691 filed 29 Oct. 2008, which designated the U.S. and claims the benefit of U.S. Provisional No. 61/015,298 filed 20 Dec. 2007, the entire contents of each of which are hereby incorporated by reference.

TECHNICAL FIELD

The technology herein generally relates to the control of home devices connected to a Local Area Network, like personal video recorders, TV, washing machines, etc, from a so-called Control Point terminal having data connectivity to said Local Area Network.

BACKGROUND

At present, homes and offices have pluralities of so-called Consumer Electronics (hereinafter CE) devices like Residential Gateways (hereinafter RGW), TV, Personal Video Recorders, Media Centres, etc, which are enabled for connecting to a Local Area Network (hereinafter LAN). Other non-CE devices like washing machines, refrigerators, surveillance devices, etc, may also be enhanced to be LAN-attachable. A so-called home-LAN may thus include home CE devices and home non-CE devices attachable to said home-LAN, and which are accessible and controllable from a Control Point (hereinafter CP), the latter having data connectivity to said home-LAN. These CE and non-CE attachable devices are further referred to as LAN-attachable devices throughout the present specification.

In particular, a CP may be a cellular handset directly attached to the home-LAN, namely a so-called LAN-home-attached CP, such as those terminals with WLAN connectivity, or remotely attached to the home-LAN through a Public Data Network (hereinafter PDN), namely a so-called LAN-remote-attached CP.

A conventional way of remotely attaching a LAN-remote-attached CP to the home-LAN is by means of a Virtual Private Network (hereinafter VPN) established between a LAN-attachable device attached to the home-LAN, such as a RGW may be, and the LAN-remote-attached CP attached to a PDN. The VPN comprises a transparent end-to-end tunnel through the PDN, providing secure exchange of point-to-point frames between the LAN-attachable device and the LAN-remote-attached CP, said tunnel being used to exchange frames carrying control data blocks.

In this respect, and before exchanging commands with a LAN-attachable device, a CP needs to discover its existence and to identify that LAN-attachable device for addressing purposes. This task is usually performed by means of some domain-specific protocol, like UPnP, SIP, and other domotic control protocols. For example, US-2006/0133392 discloses the interworking between a SIP compliant terminal in an external network for remotely handling home devices through a gateway that includes a presence server for registering devices in a home network, devices which communicate with the gateway via a UPnP protocol. Also for example, US-2007/0143489 addresses the issue of interworking between a local area network where first appliances are connected via a UPnP protocol and a wide area network, such as an IMS network, where second appliances are connected via an IMS protocol. Moreover, each particular LAN-attachable device usually supports one particular domain-specific protocol with a particular identification procedure. Thus, any client application in a CP has to support a plurality of domain-specific protocols for an effective control of a variety of LAN-attachable devices in the home-LAN. Furthermore, especially where the CP is a LAN-remote-attached CP, said CP may also require different attach procedures to the home-LAN through the PDN depending on individual domain-specific protocols.

In summary, a LAN-remote-attached CP willing to remotely control multiple LAN-attachable devices conventionally needs the establishment of a VPN tunnel to the home-LAN and, then, using multiple domain-specific protocols, the LAN-remote-attached CP needs a discovery of the identifiers of those LAN-attachable devices. Moreover, establishing a transparent end-to-end VPN tunnel is a heavy task to perform by the tunnel ends, wherein encryption and/or authentication suites need to be negotiated and agreed, keys need to be exchanged, and protocol stacks need to be set up. This may result into a lengthy process, not suitable for an application requiring high responsiveness, such as for switching-on the heating system. In addition, using an end-to-end VPN tunnel prevents the operator of the PDN from providing value-added services to the user like, for example, programming some operations to be performed at certain periods, since the operator does not have access to the home-LAN and does not know how to identify each LAN-attachable device.

SUMMARY

Certain example embodiments aim to at least minimize the above drawbacks and provides for means and method of controlling a number of LAN-attachable devices from a CP registered in an IMS network, and not necessarily being a so-called LAN-remote-attached CP.

Basically, certain example embodiments provide for the allocation of unique identifiers to each LAN-attachable device, the exposure of these identifiers to an application running in the CP and, advantageously, also in an appropriate entity under PDN operator control.

In accordance with a first aspect, there is provided a new method of controlling one or more devices attachable to a Local Area Network, hereinafter 'LAN-attachable devices', from a Control Point terminal, hereinafter 'CP-terminal', remotely attachable to said Local Area Network, hereinafter 'LAN', through an IP Multimedia Subsystem, hereinafter 'IMS', network.

This method comprises the steps of: registering a first IMS device of the Residential Gateway with a first IMS network holding a subscription for said first IMS device; discovering from the Residential Gateway through the LAN a list of identifiers of LAN-attachable devices; for each identifier of a LAN-attachable device, hereinafter "LAN-ADI", the Residential Gateway: generating a universal unique identifier "UUID" and associating said UUID with its corresponding LAN-ADI; sending at least one UUID from the Residential Gateway towards a discovery server; registering a second IMS device of the CP-terminal with a second IMS network holding a subscription for said second IMS device; the second IMS device obtaining one or more UUID from the discovery server; the second IMS device submitting through said first and second IMS networks one or more IMS commands addressing the one or more UUID towards the Residential Gateway; and the Residential Gateway submitting through the LAN corresponding commands addressing each corresponding LAN-ADI to each LAN-attachable device.

Generally speaking in this method, each UUID may be accompanied by a respective Session Initiation Protocol, hereinafter "SIP", address for addressing the corresponding LAN-attachable device through said first and second IMS networks.

Advantageously in this method, the step of discovering from the Residential Gateway the list of identifiers of LAN-attachable devices may include a step of requesting to one or more domain-specific devices of the Residential Gateway a discovery of the LAN-attachable devices in accordance with corresponding one or more domain-specific protocols and a step of receiving the identifiers of LAN-attachable devices from the one or more domain-specific devices of the Residential Gateway.

Also advantageously in this method, the step of submitting corresponding commands from the Residential Gateway includes a step of mapping the one or more IMS commands into corresponding domain-specific protocol commands understandable by the LAN-attachable devices.

In an embodiment, the discovery server is a Presence Server of the first IMS network and the method may further include a step of publishing the at least one UUID from said Presence Server. This is an advantageous alternative not loading other entities of the IMS network.

In another embodiment, where entities of the IMS network under a direct control of the operator are wanted to be involved in this method, the step of registering the first IMS device includes a step of assigning a Serving Call Session Control Server, hereinafter "S-CSCF", of the first IMS network to the first IMS device as a result of this registration, and the step of sending the at least one UUID towards the discovery server may include a step of registering the at least one UUID from the first IMS device towards said S-CSCF.

In a first alternative under the latter embodiment, the discovery server may be this S-CSCF of the first IMS network. In a second alternative under the latter embodiment, the method may further comprise a step of submitting the at least one UUID registered in the S-CSCF towards a Presence Server of the first IMS network and a step of publishing the at least one UUID from said Presence Server, and the discovery server may be said Presence Server.

On the other hand, particularly in this method the first and second IMS networks may be a same IMS network.

In accordance with a second aspect, there is provided a new Residential Gateway for accessing to a LAN, wherein one or more LAN-attachable devices are attachable thereto, from an IMS network wherein a CP-terminal is connected thereto.

This Residential Gateway comprises: an IMS device having a subscription with an IMS network and arranged for registering and communicating with said IMS network; one or more domain-specific devices for discovering a list of identifiers of LAN-attachable devices "LAN-ADI" through the LAN; a coordination agent arranged for generating a UUID per each LAN-ADI, and for associating said UUID with its corresponding LAN-ADI; this coordination agent being arranged for cooperating with the IMS device for sending at least one UUID towards a discovery server; the IMS device being arranged for cooperating with the coordination agent for receiving from the IMS network one or more IMS commands addressing the one or more UUID; and the coordination agent being arranged for cooperating with the one or more domain-specific devices for submitting through the LAN corresponding commands addressing each corresponding LAN-ADI to each LAN-attachable device.

This Residential Gateway may, for the sake of improving modularity, further comprise one or more domain-specific protocol modules for handling the one or more domain-specific devices to carry out the discovery procedure of the LAN-attachable devices, to receive the identifiers of LAN-attachable devices, and to submit the corresponding commands for each LAN-attachable device.

Particularly advantageous where the LAN-attachable devices handle different domain-specific protocols, the one or more domain-specific devices may operate in accordance with corresponding one or more domain-specific protocols respectively handled by the LAN-attachable devices.

Also for the sake of improving modularity, the Residential Gateway may further comprise an IMS protocol module for handling the IMS device to register in the IMS network, to send the at least one UUID towards the discovery server and to receive from the IMS network the one or more IMS commands addressing the one or more UUID.

In particular, where Residential Gateway includes the above IMS protocol module and the above one or more domain-specific protocol modules, the Residential Gateway may advantageously comprise a controller for interfacing the IMS protocol module and the one or more domain-specific protocol modules, and for mapping the one or more IMS commands addressing the one or more UUID into the corresponding commands addressing each corresponding LAN-ADI.

On the other hand, in order to avoid continuous generations of UUDI and associations with corresponding LAN-ADI, the Residential Gateway may further comprise a storage arranged for storing each UUID associated with its corresponding LAN-ADI per each LAN-attachable device. Moreover, where different domain-specific protocols are required for handling the LAN-attachable devices, this storage may be arranged for storing an indication of the applicable domain-specific protocol per each LAN-attachable device.

In accordance with a third aspect, there is provided a new CP-terminal remotely attachable to a LAN through an IMS network for controlling one or more LAN-attachable devices attachable to said LAN.

This CP-terminal includes an IMS device, which has a subscription with an IMS network. This IMS device is arranged for registering and communicating with said IMS network, for obtaining from a discovery server one or more UUID identifying respective one or more LAN-attachable devices; and for submitting through the IMS network one or more IMS commands addressing the one or more UUID towards the Residential Gateway in order to access the LAN for controlling the one or more LAN-attachable devices.

In particular, this CP-terminal is adapted for obtaining the one or more UUID from the discovery server, where the discovery server is a Presence Server of another IMS network, or where the discovery server is a S-CSCF of another IMS network, and where the another IMS network is likely an IMS network wherein an IMS device of the Residential Gateway holds a subscription.

As for the above method, the IMS network wherein the IMS device of the CP-terminal holds a subscription and the IMS network wherein the IMS device of the Residential Gateway holds a subscription may be a same IMS network, or different IMS networks.

On the other hand, certain example embodiments may be practised by a computer program, in accordance with a fourth aspect, the computer program being loadable into an internal memory of a computer with input and output units as well as with a processing unit, and comprising executable code adapted to carry out the above method steps. In particular, this executable code may be recorded in a carrier readable in the computer.

BRIEF DESCRIPTION OF THE DRAWINGS

The features, objects and advantages of certain example embodiments will become apparent by reading this description in conjunction with the accompanying drawings, in which:

FIGS. 3A and 3B show a simplified view of an exemplary sequence of actions to be performed in accordance with an embodiment to carry out a method of controlling a number of LAN-attachable devices from a CP registered in an IMS network.

FIG. 4 shows an exemplary configuration of a coordination agent with modules and elements included in a remote gateway for accessing LAN-attachable devices accessible through a home LAN where the devices are attachable and for receiving control commands from a CP registered in an IMS network.

DETAILED DESCRIPTION

The following describes currently preferred embodiments of a Residential Gateway for allowing the access to one or more LAN-attachable devices through a LAN from an IMS network, a CP-terminal remotely attachable to the LAN through an IMS network for controlling the one or more LAN-attachable devices, and method of controlling one or more LAN-attachable devices from a CP-terminal remotely attachable to said LAN through an IMS network.

For the sake of simplicity, a CP-terminal enabled to register in an IMS network may also be further referred to as a SIP-CP.

Figure 2:
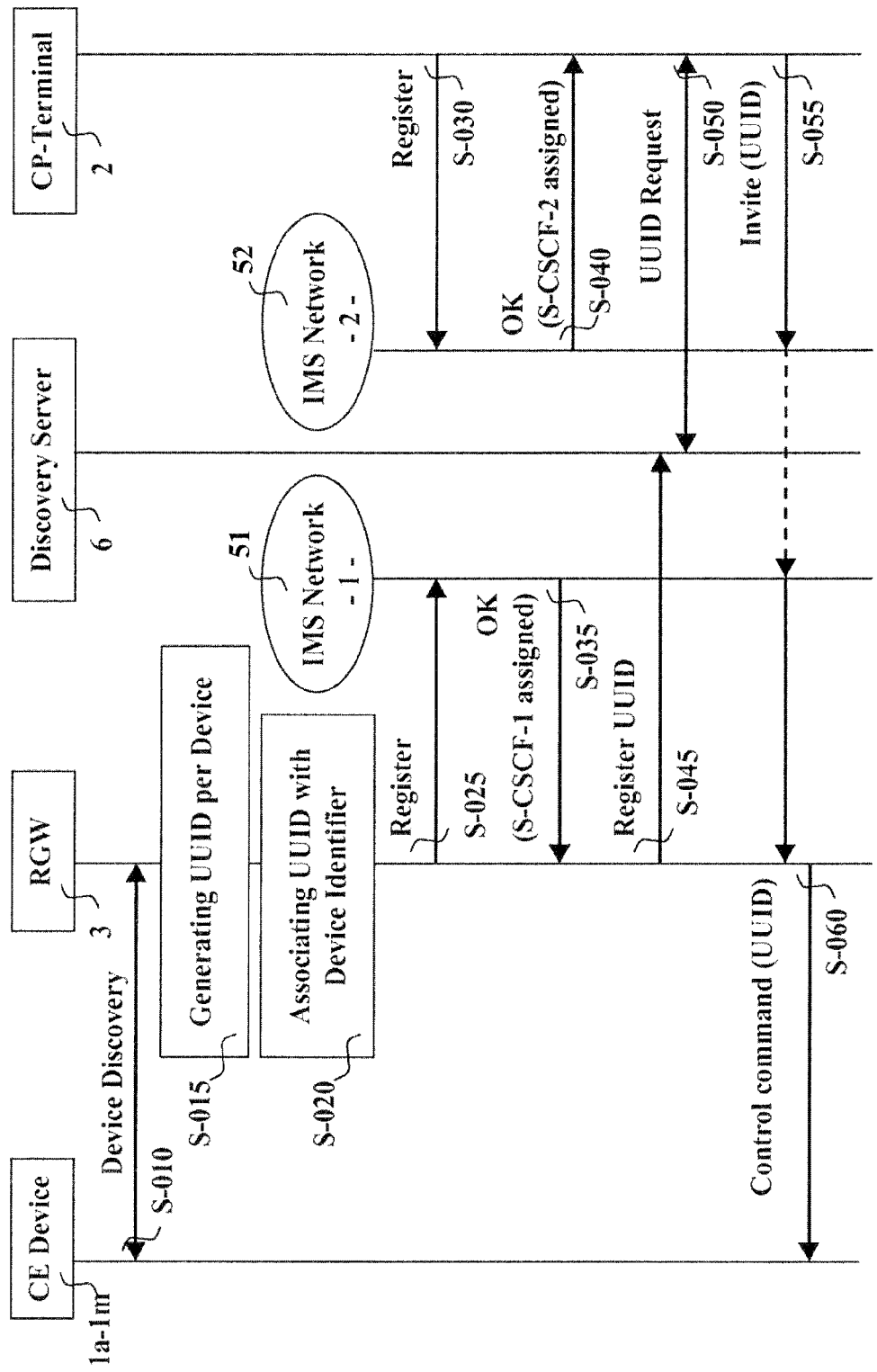
FIG. 2 illustrates a simplified view of the sequence of actions to be performed to carry out a method of controlling a number of LAN-attachable devices from a CP registered in an IMS network.

FIG. 2 illustrates an embodiment of the method of controlling one or more LAN-attachable devices from a CP-terminal remotely attachable to said LAN through an IMS network.

In this exemplary method, the Remote Gateway 3 initiates during a step S-010 the discovery of LAN-attachable devices 1a-1m through the LAN 4. In particular, this discovery is intended to obtain at the Remote Gateway 3 a list of identifiers of the LAN-attachable devices 1a-1m.

More specifically and where the LAN-attachable devices 1a-1m are accessible with different domain-specific protocols, the discovery of LAN-attachable devices 1a-1m may require one or more domain-specific devices 31a-31n of the Residential Gateway 3 to carry out the discovery of the LAN-attachable devices 1a-1m in accordance with corresponding one or more domain-specific protocols. In this case, said one or more domain-specific devices 31a-31n of the Residential Gateway may be adapted for receiving the identifiers of the LAN-attachable devices.

Once the Remote Gateway 3 has obtained the list of identifiers of the LAN-attachable devices 1a-1m, for each identifier of a LAN-attachable device, hereinafter "LAN-ADI", the Remote Gateway generates during a step S-015 a universal unique identifier "UUID" and associates during a step S-020 said UUID with its corresponding LAN-ADI.

Figure 1:
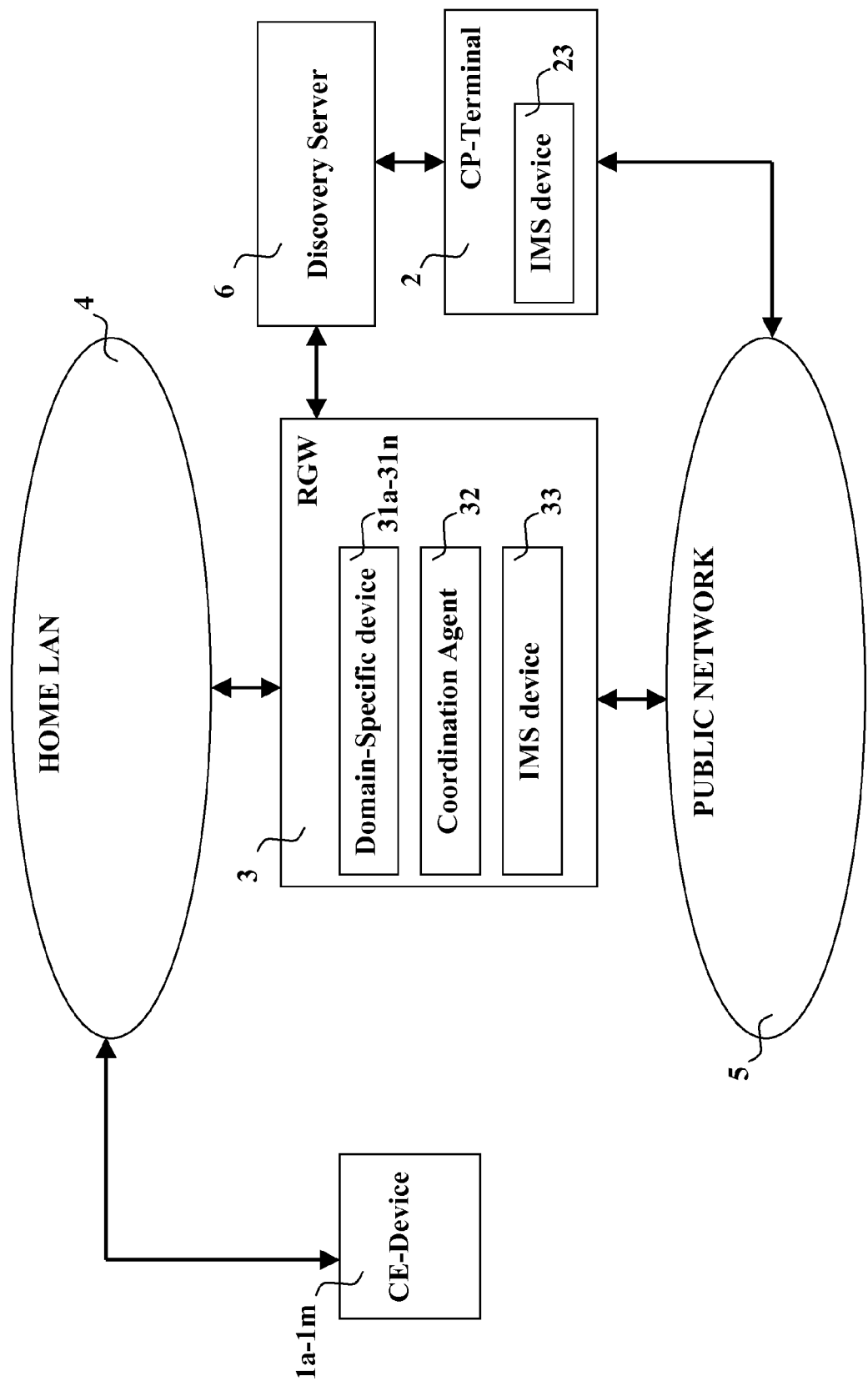
FIG. 1 basically represents a network scenario showing a number of LAN-attachable devices accessible by a remote gateway through a home LAN where the devices are attachable, a discovery server for exposal of the devices, and a control point terminal for controlling the devices through a public network.

At this stage, and if not previously carried out, an IMS device 33 of the Remote Gateway 3, as illustrated in FIG. 1 and hereinafter referred to as the first IMS device, registers during a step S-025 with a first IMS network 51 where the first IMS device holds a subscription.

In particular and as a result of this registration, during a step S-035, the first IMS device is assigned a Serving Call Session Control Server "S-CSCF" 61 of the first IMS network 51, hereinafter a first S-CSCF, namely 'S-CSCF-1'.

Once the Remote Gateway 3 has generated at least one UUID and has associated said UUID with its corresponding LAN-ADI, and once the first IMS device has registered with the first IMS network, the Remote Gateway 3 submits during a step S-045 said at least one UUID towards a discovery server 6. In particular, the at least one UUID may be accompanied by a respective SIP address for addressing the corresponding LAN-attachable device through said first and second IMS networks. Also in particular, the submission of the least one UUID towards the discovery server 6 may be carried out as a registration of the least one UUID towards the first S-CSCF 61.

In this particular case, the discovery server 6 may formerly be interpreted as said first S-CSCF 61 of the first IMS network 51. Complementary, the Remote Gateway 3 may also submit the UUID registered in the first S-CSCF 61 towards a Presence Server 62 of the first IMS network 51. In this case, the discovery server 6 may latterly be interpreted as said Presence Server 62 and the method may further include, in accordance with an embodiment, a step of publishing the at least one UUID from said Presence Sever.

Alternatively and in accordance with another embodiment, the discovery server 6, where the Remote Gateway 3 submits during the step S-045 the at least one UUID, is the Presence Server 62 of the first IMS network 51; and the method may also further include a step of publishing the at least one UUID from said Presence Sever 62.

A CP-terminal 2 remotely attachable to said LAN through an IMS network, namely a SIP-CP, wanting to initiate any control activity over the LAN-attachable devices 1a-1m, needs register with the IMS network. To this end, an IMS device 23 of the SIP-CP 2, as illustrated in FIG. 1 and hereinafter referred to as the second IMS device, registers during a step S-030 with a second IMS network 52 where the second IMS device holds a subscription. As a result of this registration, during a step S-040, the second IMS device is assigned a Serving Call Session Control Server "S-CSCF" of the second IMS network 52, hereinafter a second S-CSCF, namely 'S-CSCF-2'.

Once the second IMS device 23 of the SIP-CP 2 has registered with the second IMS network 52, said second IMS device 23 can obtain during a step S-050 from the discovery server 6 the at least one UUID submitted thereto from the Remote Gateway 3.

Then, the second IMS device 23 submits during a step S-055, through the first and second IMS networks 51-52 one or more IMS commands addressing the at least one UUID towards the Residential Gateway 3.

The Residential Gateway 3 receiving such one or more IMS commands submits during a step S-060 through the LAN 4 corresponding commands addressing each corresponding LAN-ADI to each LAN-attachable device 1a-1m.

In particular, and where the LAN-attachable devices 1a-1m are accessible with different domain-specific protocols, the submission of corresponding commands from the Residential Gateway includes a mapping from the one or more IMS commands into corresponding domain-specific protocol commands understandable by the LAN-attachable devices.

Generally speaking, the first IMS network 51, where the IMS device 33 of the Remote Gateway 3 holds a subscription, and the second IMS network 52, where the IMS device 23 of the SIP-CP 2 holds a subscription, may be different IMS networks owned by different network operators. In particular, both first and second IMS networks may be the same IMS network owned by a same network operator.

In order to carry out this method there is provided, as FIG. 1 illustrates, a Residential Gateway 3 for accessing the LAN 4, wherein one or more LAN-attachable devices 1a-1m are exemplary attached, from an IMS network 51-52; and a CP-terminal 2, remotely attachable to the LAN 4 through the IMS network 51-52 for controlling the one or more LAN-attachable devices 1a-1m. As already commented above and for the sake of simplicity, a CP-terminal enabled to register in an IMS network may also be further referred to as a SIP-CP.

FIG. 1 illustrates a basic embodiment of the Residential Gateway 3. This Residential Gateway comprises: an IMS device 33 having a subscription with the IMS network 51, which is arranged for registering and communicating with said IMS network; one or more domain-specific devices 31a-31n for discovering the list of identifiers of LAN-attachable devices through the LAN; and a coordination agent 32 arranged for generating a UUID per each LAN-ADI and for associating said UUID with its corresponding LAN-ADI. In particular, the one or more domain-specific devices may operate in accordance with corresponding one or more domain-specific protocols respectively handled by the LAN-attachable devices.

Apart from that, in this Remote Gateway, the coordination agent 32 may be arranged for cooperating with the IMS device 33 for sending the at least one UUID towards a discovery server 6, 61, or 62; the IMS device 33 may be arranged for cooperating with the coordination agent 32 for receiving from the IMS network 51 the one or more IMS commands addressing the one or more UUID; and the coordination agent 32 may be arranged for cooperating with the one or more domain-specific devices 31a-31n for submitting through the LAN 4 corresponding commands addressing each corresponding LAN-ADI to each LAN-attachable device.

Advantageously, where more than one domain-specific protocol exist, the Residential Gateway 3 may further comprise one or more domain-specific protocol modules 321a-321n, as illustrated in FIG. 4, for handling the one or more domain-specific devices 31a-31n to carry out the discovery procedure of the LAN-attachable devices, to receive the identifiers of LAN-attachable devices, and to submit the corresponding commands for each LAN-attachable device. In this respect, FIG. 4 illustrates an embodiment where the coordination agent 32 includes the one or more domain-specific protocol modules 321a-321n. In other embodiments not illustrated in any drawing the one or more domain-specific protocol modules 321a-321n may be provided as an individual element of the Residential Gateway 3, or as an integral part of, or combined with, the domain-specific devices 31a-31n.

In a similar manner as the domain-specific protocol modules 321a-321n are provided in the Residential Gateway 3 for handling the one or more domain-specific devices 31a-31n, the Residential Gateway 3 may further comprise an IMS protocol module 322 for handling the IMS device 33 to register in the IMS network 51, to send the at least one UUID towards the discovery server 6, 61, or 62 and to receive from the IMS network the one or more IMS commands addressing the one or more UUID. In this respect, FIG. 4 illustrates an embodiment where the coordination agent 32 includes the IMS protocol module 322. In other embodiments not illustrated in any drawing the IMS protocol module 322 may be provided as an individual element of the Residential Gateway 3, or as an integral part of, or combined with, the IMS device 33.

In an embodiment, where the IMS protocol module 322 and the one or more domain-specific protocol modules 321a-321n are included in the coordination agent 32 illustrated in FIG. 4, such coordination agent of the Residential Gateway 3 may further include a controller 320 for interfacing the IMS protocol module 322 and the one or more domain-specific protocol modules 321a-321n, and for mapping the one or more IMS commands addressing the one or more UUID into the corresponding commands addressing each corresponding LAN-ADI. Aligned with above embodiments, which are not illustrated in any drawing, the IMS protocol module 322, the domain-specific protocol modules 321a-321n and the controller 320 may be provided as individual elements of the Residential Gateway 3.

Taking into account that the Residential Gateway 3 associates, for each LAN-attachable device, the UUID with its corresponding LAN-ADI, the Residential Gateway may further include a storage 323 arranged for storing each UUID associated with its corresponding LAN-ADI per each LAN-attachable device. Moreover, where more than one domain-specific protocol exists, the storage 323 of the Residential Gateway 3 may be arranged for also storing an indication of the applicable domain-specific protocol per each LAN-attachable device.

FIG. 1 also illustrates a basic embodiment of the SIP-CP 2. This SIP-CP comprises: an IMS device 23, which has a subscription with an IMS network 52 and is arranged for registering and communicating with said IMS network. This IMS device 23 is arranged for obtaining from a discovery server 6, 61 or 62 the one or more UUID identifying the respective one or more LAN-attachable devices 1a-1m; and is also arranged for submitting through the IMS network 52 the one or more IMS commands addressing the one or more UUID towards the Residential Gateway 3 for accessing the LAN 4 for controlling the one or more LAN-attachable devices 1a-1m.

In particular, the discovery server addressable from the IMS device 23 of the SIP-CP 2 may be the Presence Server 62 or the S-CSCF 61 of the IMS network 51, where the IMS device 33 of the Residential Gateway 3 holds its subscription.

In the following a further particular embodiment is discussed with reference to FIG. 3A-3B.

Under this further particular embodiment, FIG. 3A illustrates a first sequence of actions involving the discovery of LAN-attachable devices by the Remote Gateway and preparations for publication at a Presence Server, whereas FIG. 3B illustrates the device control by the CP-terminal.

As illustrated in FIG. 3A, the Remote Gateway 3 initiates the discovery of LAN-attachable devices 1a-1m through the LAN 4 during a step S-010, as for the previous embodiment illustrated in FIG. 2. The discovery is intended to obtain at the Remote Gateway 3 the list of identifiers of the LAN-attachable devices 1a-1m.

As for the embodiment illustrated in FIG. 2, also for this embodiment illustrated in FIG. 3A, and where the LAN-attachable devices 1a-1m are accessible with different domain-specific protocols, the discovery of LAN-attachable devices may require one or more domain-specific devices 31a-31n of the Residential Gateway 3 to carry out the discovery, and to receive the identifiers, of the LAN-attachable devices in accordance with more than one domain-specific protocol.

The Remote Gateway 3 may thus command a set of built-in domain-specific protocol modules (realized as physical electronic subsystems using e.g. discrete digital chips), each module supporting a given communications protocol (e.g. SIP, DLNA, UPnP etc.), to discover other devices attached to the home LAN supporting that same communications protocol;

allocating a UUID to each discovered LAN-attachable device and storing in an internal memory 323 an association between the allocated UUID and the protocol-specific device identifier (e.g. SIP AoR in case of a SIP-supporting device, or device URN in case of a UPnP-supporting device) and device characteristics (e.g. supported media codecs, network addresses, supported capabilities, etc).

Once the Remote Gateway 3 has obtained the list of identifiers of the LAN-attachable devices "LAN-ADI", for each LAN-ADI, the Remote Gateway generates during a step S-015 a universal unique identifier "UUID" and associates during a step S-020 said UUID with its corresponding LAN-ADI.

At this stage, and if not previously carried out, the first IMS device 33 of the Remote Gateway 3 illustrated in FIG. 1 registers during a step S-075 with the first IMS network 51 where the first IMS device holds a subscription. As a result of this registration, an OK response to the registration and received during a step S-080, the first IMS device is assigned a first S-CSCF 61, namely 'S-CSCF-1', of the first IMS network 51.

The Remote Gateway 3 may contain an IMS endpoint that includes an ISIM bound to an IMS service subscription and one or more SIP Address of Record (hereinafter SIP-AoR) associated to said subscription.

Complementary to the registration of the IMS device 33, and not shown in any drawing, for each LAN-attachable device discovered above, the Remote Gateway issues a registration request towards the S-CSCF 61 in the first IMS network 51, including in each request a 'Contact' header containing the UUID discovered during the discovery phase.

On reception of each OK response to each registration request, the Remote Gateway extracts the value of an 'Expires' header in that response and starts a periodic timer to be set to time-out after the time that corresponds to that value has elapsed; so that on each time-out the Remote Gateway may command the corresponding domain-specific protocol module to restart the discovery of a LAN-attachable device. In this way, the S-CSCF 61 in the IMS network always has an accurate view of the devices currently active in the home LAN.

In this embodiment, from time to time, the S-CSCF 61 of the first IMS network 51 notifies during steps S-090 the Remote Gateway of any SIP AoR that has been registered using the same subscription and the 'Contact' addresses bound to said AoR. Where this happens, the Remote Gateway 3 extracts the 'Contact' addresses and, likely after having successfully answered the notification during a step S-095, the Remote Gateway 3 may publish it during a step S-100 in a Presence Server 62 of the first IMS network, bound to the respective SIP AoR. In this way, the LAN-attachable devices attached to the home LAN 4 become visible from any SIP-CP 2 with access to the IMS network of the Presence Server. Along with the 'Contact' address, the Remote Gateway may publish known characteristics of each LAN-attachable device in the form of a descriptive document expressed in a machine-understandable language. This allows other entities to know more details about that device (e.g. if a LAN-attachable device is an MP3 player, it would be useless to stream a video to that device; thus, the aforementioned document expresses that the device it is describing only supports audio).

As already commented above, a CP-terminal 2 remotely attachable to the home LAN through an IMS network, namely a SIP-CP, wanting to initiate any control activity over the LAN-attachable devices 1a-1m, needs register with the IMS network. To this end, and not illustrated in FIG. 3A-3b but similar as for the embodiment illustrated in FIG. 2, an IMS device 23 of the SIP-CP 2, namely the second IMS device, registers with a second IMS network 52 where the second IMS device holds a subscription. As a result of this registration the second IMS device is assigned an S-CSCF of the second IMS network 52, namely 'S-CSCF-2' not illustrated in any drawing.

Once the second IMS device 23 of the SIP-CP 2 has registered with the second IMS network 52, said second IMS device 23 may query during a step S-110 the presence server 62, as illustrated in FIG. 3B, about the available LAN-attachable devices. This query may be carried out in the form of a subscription towards the presence server during the step S-110 and a successful result during a step S-115. The presence server 62 may return a notification during a step S-120 with a SIP URI for each UUID that can be addressed. Such notification may be successfully answered by the SIP-CP 2 during a step S-125.

Then, the second IMS device 23 submits during a step S-130, through the first and second IMS networks 51-52, one or more IMS commands with a SIP Invite message addressing the at least one UUID towards the Residential Gateway 3.

When the Remote Gateway receives the SIP Invite addressing any SIP AoR, the Remote Gateway knows they are registered using the same subscription, it checks for the presence of a parameter including a UUID in the contents of the 'P-Called-Party' header and, if that is the case, it checks the UUID against the internal memory 323; if there is a match, the Remote Gateway extracts the body of the SIP Invite, which might include one or more commands that are to be passed to the LAN-attachable device associated with the UUID, and passes these IMS commands to the corresponding domain-specific protocol module. The protocol module maps during a step S-135 these IMS commands to semantically equivalent commands expressed in the language of the protocol that the domain-specific protocol module supports and sends during a step S-140 the mapped commands to the concerned LAN-attachable device. In this respect, the SIP Invite might carry no command at all; nevertheless, the Remote Gateway might be able to figure out the issuing SIP device in the public IMS network from such invitation, and might instruct the corresponding domain-specific protocol module to generate the semantically equivalent commands in the language of the protocol supported by that module. For example, a SIP Invite request carrying no command in its body might be interpreted by the Remote Gateway as a command to start playing certain media file at the addressed LAN-attachable device.

Any mapped command passed to the LAN-attachable devices may trigger a corresponding response at that device that arrives to the corresponding domain-specific protocol module in the Remote Gateway. The Remote Gateway might map during a step S-150 those responses to semantically equivalent SIP responses and might submit the mapped SIP responses towards the CP-terminal 2 during a step S-155. Said responses might include respective response bodies containing documents expressed in an abstract, domain-independent language in order to match the degree of expressiveness of the SIP response to that of the domain-specific protocol response, that is, the domain-specific protocol response might contain a human-readable text indicating why the respective command failed, and that text might be packed in the body of a 3xx SIP response that would be sent to the SIP device in the public IMS network.

In the following further particular embodiments are discussed with an eye to illustrate the reader on several advantageous implementations with specific details.

The coordination agent 32 of the Remote Gateway 3 is connected with the IMS device 33 on one side and with as many domain-specific devices 31a-31n as different protocols are used inside the home LAN 4 on the other side.

This coordination agent 32 of the Remote Gateway 3 may include, as shown in FIG. 4, a re-writable random access memory 323 that in turn includes a dual-column table with associative properties, so that when a string of octets is applied to one side of this memory it finds the table row containing said string in that side and returns the string of octets in the same row on the opposite side.

In order to carry out the discovery of LAN-attachable devices 1a-1m, the coordination agent 32 may activate in sequence each of its domain-specific protocol modules. On activation, a domain-specific protocol module: requests the domain-specific device to perform a home LAN device discovery according to the procedures defined for the domain-specific protocol; gathers from the domain-specific device the result of the device discovery, in the form of a list of identifiers for the discovered LAN-attachable devices 1a-1m, namely a list of LAN-ADI, each identifier having an associated description in the form of attribute-value pairs or any other format defined by the domain-specific protocol. For each gathered device identifier, the domain-specific protocol module: generates a UUID, which may be made of, or be part of, or be the LAN-ADI; stores in a free row in the associative table 323 the couple of LAN-ADI and UUID; and requests the IMS device 33 to register in S-CSCF 61 of the first IMS network 51, including as parameter of the 'Contact' header in the REGISTER request a URN encapsulating the just-generated UUID. Optionally, once the registration is complete, the domain-specific protocol module may compose a presence document according to the well known PIDF format, from the description associated to the LAN-ADI once processed, and may request the IMS device 33 to publish the presence status of the SIP URI in the 'Contact' header received in the 200 response from the S-CSCF 61 associated to the composed PIDF-compliant presence document.

Depending on the different domain-specific protocols supported by the different LAN-attachable devices 1a-1m, different discovery procedures may turn up. For instance, if the domain-specific protocol is a so-called UPnP, the UPnP-specific device multicasts on the home LAN 4 an M-SEARCH HTTP request addressing the UPnP SSDD multicast address and port.

In order to keep fresh the list of discovered LAN-attachable devices and their identifiers, namely LAN-ADI's, the coordination agent 32 may re-activate any or all of its domain-specific protocol modules. One optimum way of performing the re-activation is doing it before expiry of the time established by the value of the "Expires" header set by the S-CSCF in the 200 response to the REGISTER request elapses, so that the registrations in the S-CSCF are kept accurate.

On the other hand, thanks to the subscription to registration status that the IMS device 23 in the remote SIP-CP 2 maintains, a control application in the remote SIP-CP, not illustrated in any drawing, receives notifications of each registration performed by the coordination agent 32. This allows the control application to keep an up-to-date view of the LAN-attachable devices in the home LAN 4.

Regarding the CP-terminal 2, generally referred to as SIP-CP throughout the present specification, further embodiments and some advantageous implementation details are discussed in the following.

For instance, where the control application in the remote SIP-CP 2 determines the issue of a command addressing a specific LAN-attachable device, the control application firstly obtains the SIP URI of said LAN-attachable device. Said SIP URI may be obtained in one of two ways: from the reg-event XML documents received by the IMS device 23 of the SIP-CP 2 in notifications about registration status issued by the S-CSCF 61; or, if the coordination agent has published presence information about the discovered LAN-attachable devices, the SIP-CP may query the presence server 62 for the available LAN-attachable devices. The presence server 62 may return the list of SIP URIs that can be addressed.

From the above two approaches the latter one is preferable, since from the presence information stored about each published SIP URI a user may be able to know the type and characteristics of the device to which said SIP URI corresponds. However, if a user knows certainly the type and characteristics of the device to which a SIP URI corresponds, the first approach is equally suitable.

Once the SIP URI that corresponds to the desired LAN-attachable device is obtained, the SIP-CP prepares a document containing the command or commands to be issued to said LAN-attachable device, includes them in the body of a suitable SIP request (e.g. an INVITE request for downloading/uploading digital content or a MESSAGE request for a simple command or set of commands) and requests the IMS device in the SIP-CP to send said request to the SIP URI of the LAN-attachable device.

The IMS device 33 connected to the coordination agent 32, on reception of the SIP request, passes it to the coordination agent 32. The coordination agent 32 injects the UUID in the so-called 'gr' parameter of the SIP URI in the 'Called-Party-ID' header of the received request into the associative table and obtains the LAN-ADI of the domain-specific protocol used to command that LAN-attachable device. Then, it extracts the body of the SIP request, converts it into an equivalent command in the domain-specific protocol, and requests the relevant domain-specific device 31a-31n to send the command to the LAN-ADI obtained above. The commanded LAN-attachable device may return a response to the control command that may be received by the domain-specific device 31a-31n, which passes it to the coordination agent 32. In that case, the coordination agent 32 puts the response in the body of a SIP response to the request that carried the command; sets the status code of the response to a sensible value (e.g. 200-class if the command response indicates the operation was executed successfully or 500-class otherwise); and requests the IMS device 33 to return the SIP response to the issuer of the corresponding SIP request.

In addition to overcoming the drawbacks of certain example embodiments, the above teaching may thus offer the advantage of simplifying the complexity of the SIP-CP by removing the needs for supporting arrangements of a Virtual Private Network and multiple control protocols. Moreover, with the optional presence of extensions, it allows users to share LAN-attachable devices with other users and to grant or deny access to said devices by means of presence information access with white lists and black lists. Furthermore, the operator of the IMS network can provide value-added services involving specific LAN-attachable devices in the home LAN.

Certain example embodiments may also be practised by a computer program, loadable into an internal memory of a computer with input and output units as well as with a processing unit. This computer program comprises to this end executable code adapted to carry out the above method steps when running in the computer. In particular, the executable code may be recorded in a carrier readable means in a computer.

The embodiments described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method of controlling one or more devices attachable to a local area network (LAN) from a control point (CP) terminal that is remotely attachable to the LAN through an IP Multimedia Subsystem (IMS) network, the method comprising:
    registering a first IMS device of a residential gateway with a first IMS network that holds a subscription for said first IMS device;
    discovering by the residential gateway a list of identifiers of LAN-attachable devices of the LAN;
    for each identifier (LAN-ADI) of a LAN-attachable device the residential gateway generating a universal unique identifier (UUID) and associating said UUID with the corresponding LAN-ADI;
    sending at least one UUID from the residential gateway to a discovery server;
    registering a second IMS device of a CP-terminal with a second IMS network that has a subscription for said second IMS device;
    obtaining, with the second IMS device, the at least one UUID from the discovery server;
    submitting, with the second IMS device, one or more IMS commands via said first and second IMS networks addressing the at least one UUID to the residential gateway; and
    submitting, via the residential gateway and through the LAN, corresponding commands addressing corresponding LAN-ADI to each LAN-attachable device of the LAN-attachable devices.

2. The method of claim 1, further comprising requesting to one or more domain-specific devices of the residential gateway a discovery of the at least one LAN-attachable device in accordance with corresponding one or more domain-specific protocols; and
    receiving the list of identifiers of LAN-attachable devices from the one or more domain-specific devices of the residential gateway.

3. The method of claim 1, wherein each UUID is accompanied by a respective session initiation protocol (SIP) address for addressing a corresponding LAN-attachable device of the LAN-attachable devices through said first and second IMS networks.

4. The method of claim 1, wherein submitting the corresponding commands includes mapping the one or more IMS commands into corresponding domain-specific protocol commands understandable by the LAN-attachable devices.

5. The method of claim 1, wherein the discovery server is a presence server of the first IMS network and the method further comprises transmitting the at least one UUID from said presence server.

6. The method of claim 1, wherein:
    registering the first IMS device includes assigning a serving call session control server (S-CSCF) of the first IMS network to the first IMS device as a result of the registration of the first IMS device, and
    sending the at least one UUID to the discovery server includes registering the at least one UUID from the first IMS device to said S-CSCF.

7. The method of claim 6, wherein the discovery server is the S-CSCF of the first IMS network.

8. The method of claim 6, further comprising:
    submitting the at least one UUID registered in the S-CSCF to a presence server of the first IMS network; and
    transmitting the at least one UUID from said presence server,
    wherein the discovery server is said presence server.

9. The method of claim 1, wherein the first and second IMS networks are a same IMS network.

10. A residential gateway for accessing to a local area network (LAN) that is configured to have one or more LAN-attachable devices communicatively attachable thereto, the residential gateway accessible from an IP multimedia subsystem (IMS) network that has a control point (CP) terminal communicatively connected thereto, the residential gateway comprising:
    an IMS device having a subscription with an IMS network, the IMS device configured to register and communicate with the IMS network;
    a domain-specific device configured to discover a list of identifiers of LAN-attachable devices through the LAN; and
    a coordination agent that is, when implemented on at least one processing unit, configured to:
        generate a universal unique identifier (UUID) for each identifier (LAN-ADI) of the list of identifiers of LAN-attachable devices;
        associate said UUID with the corresponding LAN-ADI; and
        cooperate with the IMS device to send at least one UUID to a discovery server;
    wherein the IMS device is further configured to cooperate with the coordination agent to receive, from the IMS network, one or more IMS commands addressing the at least one UUID,
    wherein the coordination agent is further configured to cooperate with the domain-specific device to submit, via the LAN, corresponding commands addressing each corresponding LAN-ADI to each LAN-attachable device.

11. The residential gateway of claim 10, wherein the domain specific device operates in accordance with a corresponding domain-specific protocol handled by the LAN-attachable devices.

12. The residential gateway of claim 10, further comprising:
    a domain-specific protocol module that is, when implemented on the at least one processing unit, configured to:
        handle the domain-specific device to carry out discovery of the LAN-attachable devices;
        receive the list of identifiers of LAN-attachable devices; and
        submit the corresponding commands for each LAN-attachable device.

13. The residential gateway of claim 10, further comprising an IMS protocol module that is, when implemented on the at least one processing unit, configured to:
    handle the IMS device to register in the IMS network;
    send the at least one UUID to the discovery server; and
    receive from the IMS network the one or more IMS commands addressing the one or more UUID.

14. The residential gateway of claim 12, further comprising a controller that is, when implemented on the at least one processing unit, configured to:
    interface the IMS protocol module and the domain-specific protocol module;
    map the one or more IMS commands addressing the one or more UUID into the corresponding commands addressing each corresponding LAN-ADI.

15. The residential gateway of claim 10, further comprising a storage medium configured to, in conjunction with the processing unit, store each UUID associated with the corresponding LAN-ADI per each LAN-attachable device.

16. The residential gateway of claim 15, wherein the storage medium is further configured to, in conjunction with the processing unit, store an indication of the applicable domain-specific protocol per each LAN-attachable device.

17. A control point (CP) terminal that is remotely attachable to a local area network (LAN) through an IP multimedia subsystem (IMS) network for controlling one or more LAN-attachable devices, the CP-terminal comprising:
   an IMS device having a subscription with an IMS network and that is, when implemented on at least one processing unit, configured to:
      register and communicate with said IMS network;
      obtain, from a discovery server, one or more universal unique identifier (UUID) that respectively identify one or more of the LAN-attachable devices; and
      submit, via the IMS network, one or more IMS commands that address the one or more UUID to a residential gateway for accessing to the LAN for controlling the one or more LAN-attachable devices.

18. The CP-terminal of claim 17, wherein the discovery server is a presence server of another IMS network where a second IMS device of the residential gateway has a subscription.

19. The CP-terminal of claim 17, wherein the discovery server is a serving call session control server (S-CSCF) of another IMS network where a second IMS device of the residential gateway holds a subscription.

20. The CP-terminal of claim 18, wherein the IMS network and the another IMS network, where a second IMS device of the residential gateway holds a subscription, are a same IMS network.

\* \* \* \* \*

UNITED STATES PATENT AND TRADEMARK OFFICE
CERTIFICATE OF CORRECTION

| | | |
|---|---|---|
| PATENT NO. | : 8,483,094 B2 | Page 1 of 1 |
| APPLICATION NO. | : 12/809295 | |
| DATED | : July 9, 2013 | |
| INVENTOR(S) | : Arauz-Rosado | |

It is certified that error appears in the above-identified patent and that said Letters Patent is hereby corrected as shown below:

On the Title Page, item (57), under "ABSTRACT", in Column 2, Line 9, delete "(S050)," insert -- (S-050), --, therefor.

On the Title Page, item (57), under "ABSTRACT", in Column 2, Line 10, delete "though" and insert -- through --, therefor.

In the Specification

In Column 6, Line 27, delete "Sever." and insert -- Server. --, therefor.

In Column 6, Line 33, delete "Sever 62." and insert -- Server 62. --, therefor.

Signed and Sealed this
Third Day of December, 2013

Margaret A. Focarino
*Commissioner for Patents of the United States Patent and Trademark Office*